United States Patent [19]
Krolopp et al.

[11] Patent Number: 5,699,408
[45] Date of Patent: Dec. 16, 1997

[54] INTERNATIONAL MOBILE STATION IDENTIFICATION METHOD AND SIGNALING SYSTEM FOR CELLULAR RADIOTELEPHONES AND SYSTEMS

[75] Inventors: Robert K. Krolopp, Riverwoods; Anthony E. Akers, Kildeer, both of Ill.

[73] Assignee: Motorola, Inc., Schaumburg, Ill.

[21] Appl. No.: 512,243

[22] Filed: Aug. 7, 1995

[51] Int. Cl.$^6$ ............................................. H04Q 7/00
[52] U.S. Cl. ............................................. 375/59
[58] Field of Search .................. 379/58, 59; 455/15

[56] References Cited

U.S. PATENT DOCUMENTS

| | | | |
|---|---|---|---|
| 4,473,720 | 9/1984 | Hegi | 179/90 B |
| 4,521,648 | 6/1985 | Hegi | 179/90 B |
| 5,159,701 | 10/1992 | Barnes et al. | 455/15 |
| 5,557,654 | 9/1996 | Maenpaa | 379/58 |
| 5,566,183 | 10/1996 | Partya | 371/2.1 |
| 5,629,974 | 5/1997 | Rajala et al. | 379/58 |

FOREIGN PATENT DOCUMENTS

94/22260  9/1994  WIPO ........................... H04M 11/00

*Primary Examiner*—William Cumming
*Attorney, Agent, or Firm*—Rolland R. Hackbart

[57] ABSTRACT

A cellular radiotelephone or MS (100) includes an international mobile station identification including a mobile country code MCC, a mobile network code MNC, an area code MIN2 and a local number MIN1, all of which are stored in the EEPROM memory (124) of the MS. In the IMSI signaling system, a unique MIN1 coded number in the IMSIQ field of access and order messages is used to identify an IMSI access message from an IMSI MS or an IMSI order message from an IMSI base station or BS. In receiving order messages, an IMSI MS first looks for its MIN1, and if not found, then looks for unique MIN1 coded number in the IMSIQ field. If the unique MIN1 coded number is detected, the IMSI MS then looks for MIN1 in the last word of the message.

6 Claims, 2 Drawing Sheets

INTERNATIONAL MOBILE STATION IDENTIFICATION METHOD AND SIGNALING SYSTEM FOR CELLULAR RADIOTELEPHONES AND SYSTEMS

BACKGROUND OF THE INVENTION

The present invention is generally related to cellular radiotelephones and systems, and more particularly to an international mobile station identification method and signaling system for cellular radiotelephones and systems.

Cellular radiotelephones (referred to as mobile stations or MSs) currently in use in the Americas have a ten-digit mobile identification number ("MS number") that includes a three-digit area code ("MIN2") and a seven-digit local number ("MIN1"). Each ten-digit MS number can be duplicated in the USA, Brazil, Argentina, Chile and other Americas countries. In landline telephone systems, the telephone numbers in each country further include a country code that is unique to each country and appended to the landline telephone number. Cellular radiotelephone systems have adopted a similar numbering plan by appending five-digits consisting of a mobile country code ("MCC") and a mobile network code ("MNC") to the ten-digit MS number. Therefore, for purposes of international mobile station identification ("IMSI"), each MS has an international MS number consisting of an MCC, MNC, MIN2 and MIN1.

However, existing American-type cellular systems have been designed to only use MIN2 and MIN1. As a result, an IMSI MS from Argentina may not be allowed operate in the USA since it will very likely have the same MIN2 and MIN1 as that of an old MS in the USA. For example, the first word ("Word A") of an order message directed to an MS contains MIN1, the local MS number, and has no additional bits. As shown in Table 1 below, MIN1 is a twenty-four bit field included in Word 1 of a message.

TABLE 1

Word 1 - Abbreviated Address Word

| FIELD | LENGTH (BITS) |
|---|---|
| T1T2 | 2 |
| DCC | 2 |
| MIN1$_{23-0}$ | 24 |
| P | 12 |

Since MIN1 can be identical for MSs with different MCCs, a page from a BS directed to an IMSI MS could result in a false page to a old MS with the same MIN1.

In order to implement IMSI in the Americas in new MSs, it is necessary to include the MCC and MNC with each MS number to provide an IMSI MS number. Any solution to this problem must be backwards compatible such that old MSs listening to the cellular radiotelephone system control channel will not falsely interpret a page to an IMSI MS. One possibility is to add additional words to the pages sent by cellular base stations ("BSs") to the MSs on the forward control channel. However, that solution is impractical since forward channel capacity is wasted by the need to deliver the two additional IMSI messages for each page or order message, and cellular radiotelephone systems in the Americas are reaching capacity limits in some service areas due to the increasing number of new MSs being added each day.

Additional complications due to this solution are encountered on the reverse control channel carrying messages or orders from an IMSI MS to a BS. An additional word can not be accommodated in an origination from an MS. Also, responses from an IMSI MS must not be interpreted by an old-type BS that can not accommodate IMSI, and therefore a new message type would be needed for each access message type from and IMSI MS. However, there are not enough available unassigned message types in existing cellular radiotelephone systems in the Americas to accommodate this. For the foregoing reasons, there is a need for an new IMSI process which is backwards compatible with existing cellular radiotelephone systems and that can be implemented without degradation in cellular radiotelephone system capacity.

DESCRIPTION OF THE PREFERRED EMBODIMENT

Briefly described, the present invention encompasses a signaling system for a radiotelephone system in a particular country where messages including at least a first word and a second word are communicated between base stations and mobile stations. Each mobile station of a first group of the mobile stations (mobile stations registered in a different country) is assigned mobile station identification numbers including at least a country code and a local number. Each mobile station of a second group of the mobile stations (mobile stations registered in the country) is assigned mobile station identification numbers including at least a local number. Each of the messages comprises a first word including a local number for a message for a mobile station in the first group or the second group or including a first predetermined coded number for a message for a mobile station in the first group, the first word having a plurality of second predetermined coded numbers for encoding a local number of a mobile station in the first group or the second group, and the first predetermined coded number not being included in the plurality of second predetermined coded numbers. A second word is appended to a message when the first word includes the first predetermined coded number, said second word including a plurality of third predetermined coded numbers for encoding a local number of a mobile station in the first group.

The present invention also encompasses a method for receiving international mobile station identification in a radiotelephone system where messages including at least a first word and a second word are communicated between base stations and mobile stations. The first word of a message contains a predetermined coded number or a coded local number. The second word of a message contains a local number if the first word contains the predetermined coded number. Each mobile station of a first group of the mobile stations stores a mobile station identification number including at least a country code and a local number. Each mobile station of a second group of the mobile stations stores a mobile station identification number including at least a local number. The method comprises the steps of: receiving a first word of a message; detecting a local number in the first word, comparing the detected local number to the stored local number, and processing the message if the detected local number and the stored local number are the same; and detecting the predetermined coded number in the first word, receiving a second word of the message if the predetermined coded number is detected in the first word, detecting a local number in the second word, comparing the detected local number in the received second word to the stored local number, and processing the message if the detected local number and the stored local number are the same.

Figure 1:
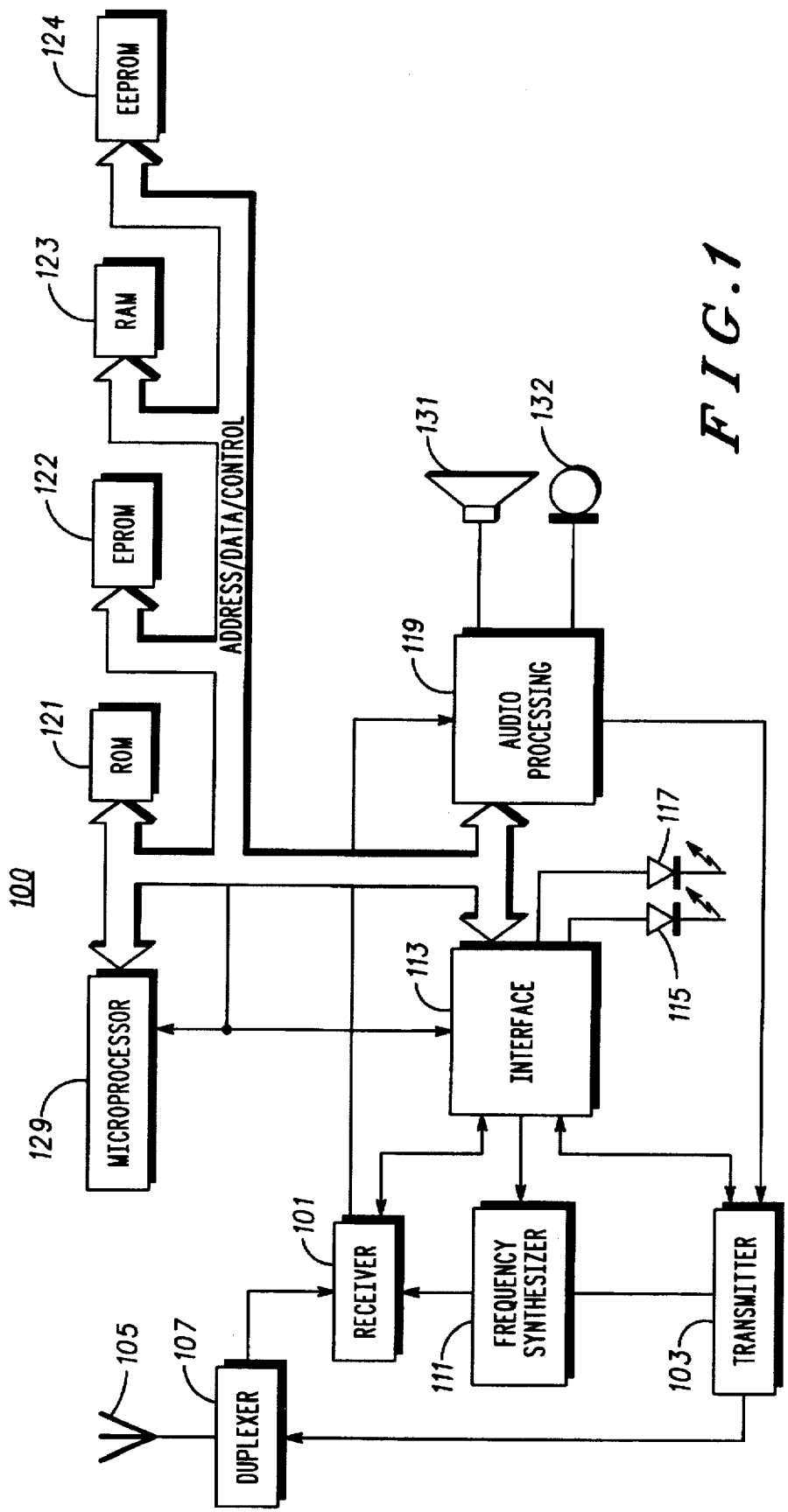
FIG. 1 is a block diagram of an MS 100 which may advantageously utilize the IMSI process of the present invention.

Referring to FIG. 1, there is illustrated a block diagram of an MS 100 which may advantageously utilize the IMSI process of the present invention. In the preferred embodiment, MS 100 is an AMPS-type MS that is capable of operating on the AMPS cellular radiotelephone systems in the USA, Canada, Mexico, and other countries of the Americas. MS 100 may be advantageously utilized in any AMPS-type cellular radiotelephone system in the world which accommodates IMSI according to the teachings of the present invention.

MS 100 includes a radio receiver 101 and a radio transmitter 103 coupled by duplexer 107 to antenna 105. The radio channel frequency to be used by transmitter 103 and receiver 401 is determined by microprocessor 129 and conveyed to frequency synthesizer 103 via the interface circuit 113. Audio processing circuit 119 couples audio signals from receiver 101 to speaker 131, and couples audio signals from microphone 132 to transmitter 103.

Messages to be transmitted by transmitter 103 are encoded by microprocessor 129 and coupled to transmitter 103 via the interface circuit 113. Messages received by receiver 401 are coupled via the interface circuit 113 to microprocessor 129 for decoding. Interface circuit 113 may include suitable data decoding and encoding circuitry, such as, for example the Manchester data encoding and decoding circuitry describe in U.S. Pat. No. 4,302,845, incorporated herein by reference. Interface circuitry 113 also control light emitting diodes 115 and 117, which are used to indicate operational status of MS 100.

Microprocessor 129 is coupled to memories ROM 121, EPROM 122, RAM 123 and EEPROM 124 for performing the necessary processing functions for MS 100 under control of programs stored in ROM 121. Characterizing features of MS 100 are stored in EEPROM 124 and include MCC, MNC, MIN2 and MIN1, as well as system parameters for the cellular system.

The blocks of MS 100 may be implemented as described in U.S. Pat. Nos. 5,029,233, 5,036,532 and 5,359,588, incorporated herein by reference. MS 100 may also be any conventional cellular radiotelephone, such as, for example, the transceiver shown and described in Motorola instruction manual number 68P81066E40, entitled "DYNATAC Cellular Mobile Telephone 800 MHZ Transceiver," published by and available from Motorola C & E Parts, 1313 East Algonquin Road, Schaumburg, Ill. 60196.

In order to provide a backwards compatible solution to the IMSI problem, according to the present invention, a unique MIN1 coded number in the IMSIQ field is used to identify an IMSI access message from an IMSI MS or an IMSI order message from an IMSI BS. The unique MIN1 coded number is selected so as to be invalid or not recognizable (for example, not in a range of valid coded number s) to an old MS or old BS. As a result, an old BS will treat an IMSI access message from an IMSI MS as invalid, and ignore it (e.g., this situation can occur where IMSI MS is accessing an IMSI BS and an old BS of another system also receives the IMSI access message). Similarly, an IMSI order message from a IMSI BS will be ignored by and old MS that has the same MIN1 as the IMSI MS being paged.

Referring to Table 2 below, there is shown the MIN1 of an IMSI message, where, in the preferred embodiment, the thousands digit field of the IMSI MS number is encoded with an invalid coded number. The thousands digit is a binary number in binary coded decimal format having a range from 0001 to 1100 to represent digits 1 to 9, 0, * and #. Thus, invalid coded numbers are 0000, 1101, 1110, and 1111. By setting the thousands digit to the invalid coded number of 0000, for example, all other MSs will ignore an order from a BS and only IMSI MSs would recognize it and decode the remaining words in the page. Therefore, in the IMSI signaling system of the present invention, the thousands digit in the IMSIQ field is set to the binary coded number 0000.

TABLE 2

Example MS number 523-3978

|  | MIN1 | | |
|---|---|---|---|
|  | NXX | Thousands Digit | XXX |
| Bits | 10 | 4 | 10 |
| Old MS # | 523 | 0011 for "3" | 978 |
| Imsi MS # | x | IMSIQ 0000 | x |

The 20 bits in the NXX and XXX fields of the IMSI signaling system are available for other signaling purposes with respect to IMSI MSs. In alternative embodiments, invalid coded numbers in the NXX and XXX fields which each have a maximum value of 999, may be used to page IMSI MSs. For an old MS number that is 523-3978, the thousands digit is the binary number 0011 for representing 3.

In addition to the unique MIN1 coded number in the IMSIQ field, Word A is coded for IMSI as shown below in Table 3, and an additional word containing MIN1 as shown below in Table 4 is included as the last word in the IMSI access from an IMSI MS or an IMSI order from an IMSI BS for conveying MIN1. Note that Word A also includes fields for the MNC and MCC of the MS, and the MIN2 of the MS is in Word B.

In the IMSI signaling system of the present invention, an IMSI MS recognizes an IMSI BS by detecting that an IMSI bit is set in the overhead message train sent by the IMSI BS. The IMSI bit is not set in the overhead message train sent by an old BS. If the IMSI bit is set, then the IMSI MS accesses the IMSI BS with the unique MIN1 coded number in the first word of the access message, an IMSI Word A, and the additional last word set to the MS local number. If the IMSI be is not set, then the IMSI MS accesses the old BS with the MIN1 in the first word of the access message set to the MS local number. The BS operates in a similar manner when sending messages, such as orders and pages to an old MS or an IMSI MS.

TABLE 3

| IMSI Word A - Abbreviated Address Word | |
|---|---|
| FIELD | LENGTH (BITS) |
| F=1 | 1 |
| NAWC | 3 |
| T | 1 |

TABLE 3-continued

IMSI Word A - Abbreviated Address Word

| FIELD | LENGTH (BITS) |
|---|---|
| S | 1 |
| E | 1 |
| ER=0 | 1 |
| SCM(3-0) | 4 |
| MNC | 7 |
| RSVD=000 | 3 |
| IMSIQ=0000 | 4 |
| MCC | 10 |
| P | 12 |

TABLE 4

IMSI LAST Word

| FIELD | LENGTH (BITS) |
|---|---|
| P=0 | 1 |
| NAWC=000 | 3 |
| RSVD=0 | 8 |
| $MIN1_{23-0}$ | 24 |
| P | 12 |

Since the cellular system can now determine that an access from an IMSI MS or an order from an IMSI BS is an IMSI access or IMSI order, it can now also knows that an additional word will be sent even though NAWC does not support that length. The suggestion is to simply append the additional word to the end of the message and have two last words in that case with NAWC=0. For an Extended Protocol access the message length field will support the additional word.

Figure 2:
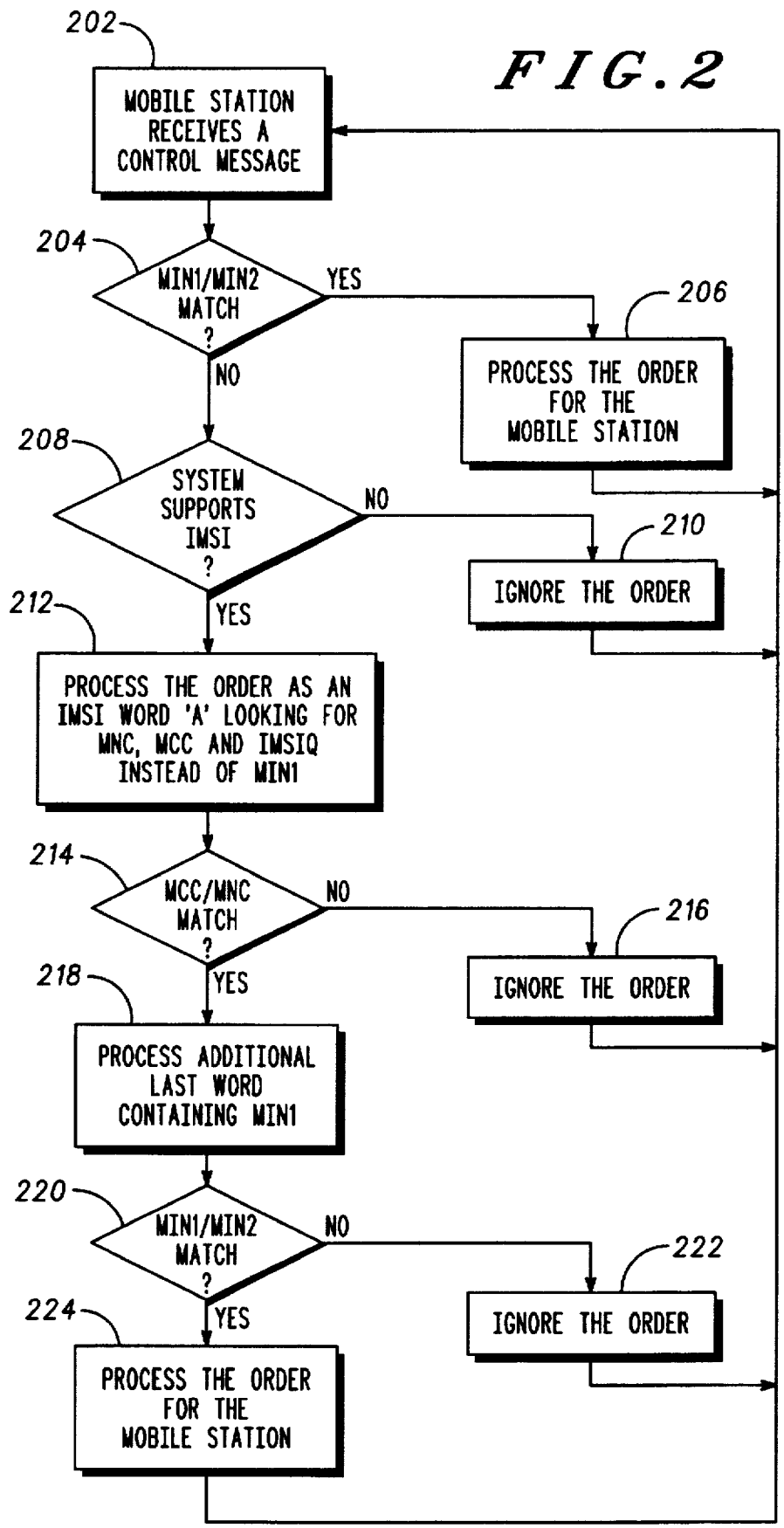
FIG. 2 is a flow chart for the process used by microprocessor 129 in FIG. 1 for processing both non-IMSI and IMSI pages and orders messages from a BS.

Referring next to FIG. 2, there is illustrated a flow chart for the process used by microprocessor 129 in FIG. 1 for processing both non-IMSI and IMSI pages and orders from a BS. The flow chart is FIG. 2 may also be used in the BS for processing both non-IMSI access messages from an old MS and IMSI access messages from an IMSI MS. Entering at block 202, MS 100 receives a control message such as an order or page from a BS. The process then proceeds to decision block 204, where a check is made to determine if MIN1 and MIN2 received in the message match the values stored in the MS memory. If they match, YES branch is taken from decision block 204 to block 206 where microprocessor 129 processes the order, and thereafter the process proceeds back to block 202 to wait for the next message.

If MIN1 and MIN2 received in the message do not match the values stored in the MS memory, NO branch is taken from decision block 204 to decision block 208, where microprocessor 129 checks to see if the thousands digit of MIN1 is coded with 0000 to indicate IMSI. If not, NO branch is taken to block 210 to ignore the order, and thereafter the process proceeds back to block 202 to wait for the next message.

If the thousands digit of MIN1 in the IMSIQ field is coded with 0000 to indicate IMSI, YES branch is taken from decision block 208 to block 212, where microprocessor 129 processes the order as an IMSI Word A, looking for MNC, MCC and IMSIQ instead of MIN1. Next, at decision block 214, microprocessor 129 checks to see if MCC and MNC received in the message match the values stored in the MS memory. If not, NO branch is taken to block 216 to ignore the order, and thereafter the process proceeds back to block 202 to wait for the next message.

If MCC and MNC received in the message match the values stored in the MS memory, YES branch is taken from decision block 214 to block 218, where microprocessor 129 processes the additional last word containing MIN1. Next, at decision block 220, microprocessor 129 checks to see if MIN1 received in the message match the value stored in the MS memory. If not, NO branch is taken to block 222 to ignore the order, and thereafter the process proceeds back to block 202 to wait for the next message. If MIN1 received in the message match the value stored in the MS memory, YES branch is taken from decision block 220 to block 224, where microprocessor 129 processes the order, and thereafter the process proceeds back to block 202 to wait for the next message.

In order to implement the IMSI signaling system of the present invention into the Electronic Industries Associates Interim Standards IS-91 for AMPS-type cellular systems, the following revisions to the IS-91 Standard are required. Copies of the IS-91 Standard may be obtained form the Electronic Industries Associates in Washington, D.C., USA. The sections of the IS-91 Standard which have been revised are underlined in the following description.

2.6.2.2 Page match

The MS must monitor MS control messages for page messages (see 3.7.1.1).

If the ROAM status is disabled, the MS must attempt to match $MIN1_p$ to $MIN1_r$ for one-word messages and both $MIN1_p$ and $MIN2_p$ to $MIN1_r$ and $MIN2_r$, respectively, for two-word messages. All decoded MIN bits must match to cause the MS to respond to the message.

If the ROAM status is enabled, the MS must attempt to match both $MIN1_p$ and $MIN2_p$ to $MIN1_r$ and $MIN2_r$, respectively. All decoded MIN bits must match to cause the MS to respond to the order.

When a match occurs, the MS must enter the System Access Task with a "page response" indication (see 2.6.3).

If IMSI bit is set, then the MS must attempt to decode the first word of the order message as IMSI Word A. If a match occurs the message must be further decoded the match both $MIN1_p$ and $MIN2_p$ to $MIN1_r$ and $MIN2_r$, respectively. When a match occurs, the MS must enter the System Access Task with a "page response" indication (see 2.6.3).

2.6.2.3 Order

The MS must monitor MS control messages for orders and must attempt to match both $MIN1_p$ and $MIN2_p$ to $MIN1_r$ and $MIN2_r$, respectively. All decoded MIN bits must match to cause the MS to respond to the order.

If the IMSI bit is set, then the MS must attempt to decode the first word of the order message as IMSI Word A. If a match occurs the message must be further decoded the match both $MIN1_p$ and $MIN2_p$ to $MIN1_r$ and $MIN2_r$, respectively. All decoded MIN bits must match to cause the MS to respond to the order message.

The responses to the following order messages are:

2.6.3.7 Service request

The MS must continue to send its message to the BS. The information that must be sent is as follows (with the formats given in 2.7.1):

Assuming the access is not an extended protocol message (see section 2.7.1.2 and Table 3.7.1.1–3).
  Then: If IMSI is set
    Then: IMSI WORD A is sent.
    Else: WORD A is sent.
  Add the following near the bottom of 2.6.3.7:
  If the access is an "origination" and IMSI is equal to 1 then send the IMSI LAST word after the last dialed digit word or IMSI LAST Word N' is sent if the access is an extended protocol access.

If the access is other than an "origination" and IMSI is equal to 1 then send the IMSI word after word with NAWC=0 or IMSI LAST Word N' is sent if the access is an extended protocol access.

| FIELD | LENGTH (BITS) |
|---|---|
| Word A - Abbreviated Address Word | |
| F=1 | 1 |
| NAWC | 3 |
| T | 1 |
| S | 1 |
| E | 1 |
| ER=0 | 1 |
| SCM (3-0) | 4 |
| MNC | 7 |
| RSVD=000 | 3 |
| IMSQI=0000 | 4 |
| MCC | 10 |
| P | 12 |
| Word A - Abbreviated Address Word | |
| F=1 | 1 |
| NAWC | 3 |
| T | 1 |
| S | 1 |
| E | 1 |
| ER=0 | 1 |
| SCM (3-0) | 4 |
| MIN1$_{23-0}$ | 24 |
| P | 12 |
| Word B Extended Address Word | |
| F=1 | 1 |
| NAWC | 3 |
| LOCAL/MSG_TYPE | 5 |
| ORDQ | 3 |
| ORDER | 5 |
| LT | 1 |
| EP=0 | 1 |
| SCM(4) | 1 |
| RSVD=00 | 2 |
| SDCC1 | 2 |
| SDCC2 | 2 |
| MIN2$_{33-24}$ | 10 |
| P | 12 |
| Word C - Serial Number Word | |
| F=0 | 1 |
| NAWC | 3 |
| SERIAL | 32 |
| P | 12 |
| Word C Authentication Word | |
| F=0 | 1 |
| NAWC | 3 |
| COUNT | 6 |
| RANDC | 8 |
| AUTHR | 18 |
| P | 12 |
| Word C - Unique Challenge Order Confirmation Word | |
| F=0 | 1 |
| NAWC | 3 |
| RSVD=0...0 | 14 |
| AUTHU | 18 |
| P | 12 |
| Word C - Base Station Challenge Word | |
| F=0 | 1 |
| NAWC | 3 |
| RANDBS | 32 |
| P | 12 |
| Word D - First Word of the Called-Address | |
| F=0 | 1 |
| NAWC | 3 |
| 1ST DIGIT | 4 |
| 2ND DIGIT | 4 |

-continued

| FIELD | LENGTH (BITS) |
|---|---|
| 3RD DIGIT | 4 |
| 4TH DIGIT | 4 |
| 5TH DIGIT | 4 |
| 6TH DIGIT | 4 |
| 7TH DIGIT | 4 |
| 8TH DIGIT | 4 |
| P | 12 |
| Word E - Second Word of the Called-Address | |
| F=0 | 1 |
| NAWC | 3 |
| 9TH DIGIT | 4 |
| 10TH DIGIT | 4 |
| 11TH DIGIT | 4 |
| 12TH DIGIT | 4 |
| 13TH DIGIT | 4 |
| 14TH DIGIT | 4 |
| 15TH DIGIT | 4 |
| 16TH DIGIT | 4 |
| P | 12 |
| Word F Third Word of the Called-Address | |
| F=0 | 1 |
| NAWC | 3 |
| 17TH DIGIT | 4 |
| 18TH DIGIT | 4 |
| 19TH DIGIT | 4 |
| 20TH DIGIT | 4 |
| 21ST DIGIT | 4 |
| 22ND DIGIT | 4 |
| 23TH DIGIT | 4 |
| 24TH DIGIT | 4 |
| P | 12 |
| Word G - Fourth Word of the Called-Address | |
| F=0 | 1 |
| NAWC | 3 |
| 25TH DIGIT | 4 |
| 26TH DIGIT | 4 |
| 27TH DIGIT | 4 |
| 28TH DIGIT | 4 |
| 29TH DIGIT | 4 |
| 30TH DIGIT | 4 |
| 31ST DIGIT | 4 |
| 32ND DIGIT | 4 |
| P | 12 |
| IMSI LAST Word | |
| F=0 | 1 |
| NAWC=000 | 3 |
| RSVD=0 | 8 |
| MIN1$_{23-0}$ | 24 |
| P | 12 |

MNC Mobile Network Code 2 Digits encoded as 10*D2 + D1
MCC Mobile Country Code 3 Digits encoded as 100*D3 + 10*D2 + D1

IMSIQ IMSI Qualifier is set to all zeroes. This creates an invalid MIN1 combination on the first word of an order which causes the order to be ignored by old systems in border cell situations.

3.6.2.2 Page

To page an MS, an MS control message must be sent (see 3.7.1.1). Home MSs may be paged with a one-word or a two-word message. Roaming MSs must be paged with a two-word message. In the case of a page with IMSI a third word is sent with MNC and MCC.

3.6.2. Order

Orders and order confirmations must be sent to MSs with a two-word MS control message (See 3.7.1.2). In the case of an order with IMSI a third word is sent with MNC and MCC.

The following orders may be transmitted to a MS operating in idle task:

3.7.1.1 Mobile Station Control Message

The MS control message can consist of one to eight words.

| IMSI Word 1 - Abbreviated Address Word | |
| --- | --- |
| FIELD | LENGTH (BITS) |
| T1T2=01 | 2 |
| DCC | 2 |
| MNC | 7 |
| RSVD=000 | 3 |
| IMSIQ=0000 | 4 |
| MCC | 10 |
| P | 12 |

In the IMSI signaling system, the MS control message can consist of one to eight words.

| FIELD | LENGTH (BITS) |
| --- | --- |
| Word 1 - Abbreviated Address Word | |
| T1T2 | 2 |
| DCC | 2 |
| $MIN1_{23-0}$ | 24 |
| P | 12 |
| Word 2 - Extended Address Word | |
| SCC = 11 | |
| T1T2 = 10 | 2 |
| SCC = 11 | 2 |
| $MIN2_{33-24}$ | 10 |
| EF=0 | 1 |
| LOCAL/MSG_TYPE | 5 |
| ORDQ | 3 |
| ORDER | 5 |
| P | 12 |
| SCC ≠ 11 | |
| T1T2 = 10 | 2 |
| SCC ≠ 11 | 2 |
| $MIN2_{33-24}$ | 10 |
| VMAC | 3 |
| CHAN | 11 |
| P | 12 |
| Word 2' - Extended Protocol Word | |
| T1T2 = 10 | 2 |
| SCC = 11 | 2 |
| $MIN2_{33-24}$ | 10 |
| EF = 1 | 1 |
| MSL | 5 |
| MST | 8 |
| P | 12 |
| Word 3 - Low Power Initial Voice Channel Assignment | |
| T1T2 = 10 | 2 |
| SCC = 11 | 2 |
| RSVD = 0 ... 0 | 9 |
| VMAC(3) | 1 |
| VMAC | 3 |
| CHAN | 11 |
| P | 12 |
| Word 3 - Extension 1st Word | |
| T1T2 = 10 | 2 |
| SCC = 11 | 2 |
| 1ST DIGIT | 4 |
| 2ND DIGIT | 4 |
| 3RD DIGIT | 4 |
| 4TH DIGIT | 4 |
| 5TH DIGIT | 4 |
| 6TH DIGIT | 4 |
| P | 12 |
| Word 4 - Extension 2nd Word | |
| T1T2 = 10 | 2 |
| SCC = 11 | 2 |
| 7TH DIGIT | 4 |
| 8TH DIGIT | 4 |
| 9TH DIGIT | 4 |
| 10TH DIGIT | 4 |
| RSVD = 0 ... 0 | 8 |
| P | 12 |

Both Extension 1st Word and Extension 2nd Word must be sent if ORDER and ORDQ indicate Extension Number Information.

| FIELD | LENGTH (BITS) |
| --- | --- |
| Word 3' - Extended Protocol Narrow Analog Channel Assignment Word (for MST = 1000 0000) | |
| T1T2 = 10 | 2 |
| DSCC | 3 |
| RSVD = 0 ... 0 | 6 |
| VMAC(3) | 1 |
| C13 | 1 |
| C12 | 1 |
| VMAC | 3 |
| CHAN | 11 |
| P | 12 |
| Word 3 - First Directed-Retry Word | |
| T1T2 = 10 | 2 |
| SCC = 11 | 2 |
| CHANPOS | 7 |
| CHANPOS | 7 |
| CHANPOS | 7 |
| RSVD = 000 | 3 |
| P | 12 |
| Word 4 - Second Directed-Retry Word | |
| T1T2 = 10 | 2 |
| SCC = 11 | 2 |
| CHANPOS | 7 |
| CHANPOS | 7 |
| CHANPOS | 7 |
| RSVD = 000 | 3 |
| P | 12 |
| Word 3 - Base Station Challenge Order Confirmation Word | |
| T1T2 = 10 | 2 |
| SCC = 11 | 2 |
| RSVD = 00 | 2 |
| AUTHBS | 18 |
| RSVD = 0000 | 4 |
| P | 12 |
| Word 3 - Unique Challenge Order Word | |
| T1T2 = 10 | 2 |
| SCC = 11 | 2 |
| RANDU | 24 |
| P | 12 |
| Word 3 - First SSD Update Order Word | |
| T1T2 = 10 | 2 |
| SCC = 11 | 2 |
| RANSSD_1 | 24 |
| P | 12 |
| Word 4 - Second SSD Update Order Word | |
| T1T2 = 10 | 2 |
| SCC = 11 | 2 |
| RANDSSD_2 | 24 |
| P | 12 |
| Word 5 - Third SSD Update Order Word | |
| T1T2 = 10 | 2 |
| SCC = 11 | 2 |
| RSVD = 0 ... 0 | 12 |
| RANDSSD_3 | 8 |

-continued

| FIELD | LENGTH (BITS) |
|---|---|
| RSVD = 0000 | 4 |
| P | 12 |
| IMSI Last Word | |
| T1T2 = 10 | 2 |
| DCC | 2 |
| $MIN1_{23-0}$ | 24 |
| P | 12 |

MNC Mobile Network Code 2 Digits encoded as 10*D2 + D1
MCC Mobile Country Code 3 Digits encoded as 100*D3 + 10*D2 + D1

The following IMSI bit is sent out periodically on the control channel to indicate that IMSI is supported in this system.

| Registration Increment Global Action Message | |
|---|---|
| FIELD | LENGTH (BITS) |
| T1T2 = 11 | 2 |
| DCC | 2 |
| ACT = 0010 | 4 |
| REGINCR | 12 |
| ISM | 1 |
| DMP | 1 |
| IMSI | 1 |
| RSVD = 0 | 1 |
| END | 1 |
| OHD = 100 | 3 |
| P | 12 |

IMSI When set indicates that MS's supporting IMSI must respond with the IMSI word on order responses.

In summary, a unique MIN1 coded number is used to identify an IMSI access from an IMSI MS or an IMSI order from an IMSI BS, thereby providing IMSI capability that is backwards compatible with existing cellular systems and that can be implemented without degradation in cellular system capacity.

We claim:

1. A signaling system for a radiotelephone system where messages including at least a first word and a second word are communicated between base stations and mobile stations, each mobile station being assigned mobile station identification numbers including at least a country code and a local number, said messages each comprising:

a first word including a local number for a message or a first predetermined coded number, the first word having a plurality of second predetermined coded numbers for encoding a local number for a mobile station, and the first predetermined coded number not being included in the plurality of second predetermined coded numbers; and a second word appended to a message when the first word includes the first predetermined coded number, said second word including a plurality of third predetermined coded numbers for encoding a local number for a mobile station.

2. A signaling system for a radiotelephone system where messages including at least a first word and a second word are communicated between base stations and mobile stations, each mobile station of a first group of the mobile stations being assigned mobile station identification numbers including at least a country code and a local number, and each mobile station of a second group of the mobile stations being assigned mobile station identification numbers including at least a local number, said messages each comprising:

a first word including a local number for a message for a mobile station in the first group or the second group or including a first predetermined coded number for a message for a mobile station in the first group, the first word having a plurality of second predetermined coded numbers for encoding a local number of a mobile station in the first group or the second group, and the first predetermined coded number not being included in the plurality of second predetermined coded numbers; and a second word appended to a message when the first word includes the first predetermined coded number, said second word including a plurality of third predetermined coded numbers for encoding a local number of a mobile station in the first group.

3. A method for receiving international mobile station identification in a radiotelephone system where messages including at least a first word and a second word are communicated between base stations and mobile stations, the first word of a message containing a predetermined coded number or a local number, the second word of a message containing a local number if the first word contains the predetermined coded number, each mobile station storing a mobile station identification number including at least a country code and a local number, said method comprising the steps of:

receiving a first word of a message;

detecting a local number in the first word, comparing the detected local number to the stored local number, and processing the message if the detected local number and the stored local number are the same; and detecting the predetermined coded number in the first word, receiving a second word of the message if the predetermined coded number is detected in the first word, detecting a local number in the second word, comparing the detected local number in the received second word to the stored local number, and processing the message if the detected local number and the stored local number are the same.

4. A method for receiving international mobile station identification in a radiotelephone system where messages including at least a first word and a second word are communicated between base stations and mobile stations, the first word of a message containing a predetermined coded number or a local number, the second word of a message containing a local number if the first word contains the predetermined coded number, each mobile station storing a mobile station identification number including at least a country code and a local number, said method comprising the steps of:

receiving a first word of a message;

detecting the predetermined coded number in the first word;

receiving a second word of the message if the predetermined coded number is detected in the first word; and detecting a local number in the second word, comparing the detected local number in the received second word to the stored local number, and processing the message if the detected local number and the stored local number are the same.

5. A method for receiving international mobile station identification in a radiotelephone system where messages including at least a first word and a second word are communicated between base stations and mobile stations, the first word of a message containing a predetermined coded number or a coded local number, the second word of a message containing a local number if the first word contains the predetermined coded number, each mobile station of a first group of the mobile stations storing a mobile station identification number including at least a country code and a local number, and each mobile station of a second group of the mobile stations storing a mobile station identification number including at least a local number, said method comprising the steps of:

receiving a first word of a message;

detecting a local number in the first word, comparing the detected local number to the stored local number, and processing the message if the detected local number and the stored local number are the same; and detecting the predetermined coded number in the first word, receiving a second word of the message if the predetermined coded number is detected in the first word, detecting a local number in the second word, comparing the detected local number in the received second word to the stored local number, and processing the message if the detected local number and the stored local number are the same.

6. The method according to claim 5, further including the step of:

in each mobile station of the second group of mobiles, ignoring the message if a local number is not detected in the first word.

* * * * *